Patented Aug. 5, 1924.

1,504,044

UNITED STATES PATENT OFFICE.

HOMER W. HILLYER, OF FARMINGTON, CONNECTICUT, ASSIGNOR TO NATIONAL ANILINE & CHEMICAL COMPANY, INC., OF NEW YORK, N. Y., A CORPORATION OF NEW YORK.

PRODUCTION OF O-NITRO-O-AMINOPHENOL-P-SULPHONIC ACID AND ITS DERIVATIVES.

No Drawing.   Application filed March 12, 1920.   Serial No. 365,345.

*To all whom it may concern:*

Be it known that I, HOMER W. HILLYER, a citizen of the United States, residing at Farmington, in the county of Hartford, State of Connecticut, have invented certain new and useful Improvements in Production of o-Nitro-o-Aminophenol-p-Sulphonic Acid and Its Derivatives; and I do hereby declare the following to be a full, clear, and exact description of the invention, such as will enable others skilled in the art to which it appertains to make and use the same.

This invention relates to an improved method of making ortho-nitro-ortho-amidophenol-para-sulphonic acid and azo dyes derived therefrom.

It has heretofore been proposed to make ortho-nitro-ortho-amidophenol-para-sulphonic acid by sulfonating ortho-amidophenol, and, without isolation, nitrating the resulting sulphonic acid, but the product so obtained has been in the form of grey crystals dissolving in hot water with a yellow-red color.

I have now found that an improved product having different properties can be produced if isolated ortho-amidophenol-p-sulphonic acid in a substantially pure state is subjected to nitration. The product thus obtainable is a bright yellow crystalline product, crystallizing from hot water in the form of bright yellow prism-shaped crystals, forming orange solutions in dilute alkali, and in the form of its mono-sodium salt crystallizing from hot aqueous solutions in the form of dark red plates containing one molecule of water of crystallization.

The starting material used in the process of the present invention is a substantially pure or purified ortho-amidophenol-para-sulphonic acid.

In producing ortho-nitro-ortho-amidophenol-para-sulphonic acid, according to the process of the present invention, the essentially pure or purified ortho-amidophenol-para-sulphonic acid is dissolved in concentrated sulfuric acid and then subjected to nitration with mixed acid containing approximately the theoretical amount of nitric acid for the nitration, and the nitration is carried out at a temperature of around 0° C. or below. The ortho-nitro-ortho-amidophenol-para-sulphonic acid can be thus produced in a sufficient state of purity so that it may be directly used, without isolation, for the production of other products obtainable therefrom. The concentrated sulfuric acid present at the end of the nitration may thus be nearly neutralized by the addition of alkali and the ortho-nitro-ortho-amidophenol-para-sulphonic acid subjected to diazotization by the addition of sodium nitrite, with the resulting conversion of the ortho-nitro-ortho-amidophenol-para-sulphonic acid into the diazo compound. By neutralizing the sulfuric acid only to the proper degree, the diazotization can be effected without the addition of further amounts of acid, the remaining unneutralized acid thus contributing to the diazotization. The diazo compounds so produced may be then coupled with a suitable compound to produce an azo-dye-stuff or an intermediate therefor.

In the carrying out of the nitration of the ortho-amidophenol-para-sulphonic acid, it is important, for best results, to regulate the amounts of concentrated sulfuric and nitric acids present, as well as to use a purified starting material.

The invention will be further illustrated by the following specific example, the parts being by weight, giving the preferred practice:

100 parts of pure dry ortho-amidophenol-para-sulphonic acid are dissolved in about 300 parts of 66° Baumé sulfuric acid, with stirring and with avoidance of the formation of lumps, until complete solution has taken place. Very little heat develops during this solution, so that the temperature needs no regulation. The mixture thus obtained is cooled to about 5 degrees below 0° C., and to this mixture there is gradually added an amount of mixed acid containing approximately the theoretical amount of nitric acid, that is, about 34 parts of nitric acid. A suitable mixed acid is one containing about 29 to 30 per cent nitric acid, about 65 per cent sulfuric acid, and about five per cent of water. The addition of the mixed acid should be at such a rate that the temperature never rises above 0° C. Stirring is continued and the temperature is maintained at or below 0° C., for a period of about two to three hours. The product is now run out on to about 500 parts of ice, the quantity of ice being such that not all of the ice is melted. The ortho-nitro-ortho-amidophenol-para-sulphonic acid is thus separated in part as a solid, and a part remains in solution. Excellent yields are thus obtainable, for example, yields from 80 to 90 per cent or higher, approximately 65 to 75 per cent of the product being obtained in a solid form, and from 15 to 30 per cent in solution.

The ortho-nitro-ortho-amidophenol-para-sulphonic acid thus separated in a solid form, can be filtered off and obtained in an isolated state. However, it is one advantage of the process of the present invention, that the product obtained is of sufficient purity, and the bulk of liquid is sufficiently small, so that the total product, including the precipitated portion and the portion remaining in solution, can be directly used and treated for the production of other products therefrom without first isolating the ortho-nitro-ortho-amidophenol-para-sulphonic acid and using it in an isolated state. This product, still containing the excess sulfuric acid and any excess nitric acid from the nitration, is preferably neutralized in part by the addition of alkali until the remaining acidity is such as is favorable for diazotization, and the diazotization is then effected by the addition of sodium nitrite. This diazotization, as above noted, can be effected without separation and isolation of the ortho-nitro-ortho-amidophenol-para-sulphonic acid, and advantage can thus be taken of the ortho-nitro-ortho-amidophenol-para-sulphonic acid which is in solution, as well as that which has been separated in a solid form.

In general, it is more advantageous to neutralize the greater part of the concentrated sulfuric acid before diazotization, so that the diazotization takes place in a weekly acid liquor or solution. The diazo compound produced is easily soluble in water, whether acid or alkaline, and it can be directly used for coupling with a suitable component, such as an amine, phenol, etc., the acidity or alkalinity being suitably regulated in a manner which will be readily understood. The diazotized product in solution can thus be coupled with beta-naphthol, H-acid, chromotropic acid, R-salt, etc., either for the direct production of azo dyestuffs or for the production of intermediates therefor.

The amounts of concentrated sulfuric and nitric acid given in the above specific description are those which have been found to give best results in practice. Any considerable decrease in the amount of sulphuric acid was found to result in a decrease in the yield, while any considerably larger amount of mixed acid was likewise found to result in a lowering of the yield, the lowering being generally proportional to the amount of excess used. So also, in the nitration, it is important to prevent any considerable increase in temperature, even a short period of increased temperature having a bad effect both on the yield and the quality of the product. In general, temperatures around or below 0° C., are necessary, and such low temperatures should be maintained during the addition of the mixed acid, as well as for a considerable time thereafter, until the nitration is completed. Even without any considerable excess of nitric acid, substantially complete nitration can, nevertheless, be obtained.

It is a characteristic advantage of the process of the invention, when a properly purified ortho-amidophenol-para-sulphonic acid is used as the starting material and when the nitration is carried out under properly regulated conditions, that the ortho-nitro-ortho-amidophenol-para-sulphonic acid thus produced is in a sufficiently pure state so that it can be directly used without isolation, for example, for diazotization and coupling to produce azo dyestuffs or azo compounds, both the diazotization and the subsequent coupling being carried out without isolation of any of the intermediates. It is a further advantage of the process that the acid for the diazotization is supplied by part of the same acid present during the nitration, so that the addition of acid to assist in the diazotization is unnecessary.

Instead of treating the ortho-nitro-ortho-amidophenol-para-sulphonic acid in the manner above described, it can, of course, be separated and obtained in an isolated state, inasmuch as the greater portion of it is already obtained in a solid form at the end of the nitration; and it is an advantage of the process of the present invention that the solid product thus directly produced and separated is of sufficient purity so that it is adapted for further treatment or use without purification, although further purification can, of course, be effected should a product of increased purity be required.

The product obtained as a solid on pouring the nitration mass upon ice and filtering is the free acid and is of a bright yellow color. By recrystallizing it from hot water it separates in the form of clear, bright yellow, well-developed prisms of considerable size (sometimes 0.5 to 1 inch in length). It is soluble in water to the extent of 1 to 2 per cent. Its solutions in dilute alkali are orange in color with small amounts of alkali and become darker on the addition of more alkali. Its mono-sodium salt crystallizes from hot aqueous solution in the form of dark red plates containing one molecule of water of crystallization. This mono-sodium salt is acid in its reaction to Congo-red paper. Its hot solutions in water are capable of decomposing carbonates. By addition of common salt to solution of the mono sodium salt the latter can be precipitated with such a degree of completeness that the solution contains not more than 1 to 2 per cent of the mono-sodium salt. The sodium salt thus salted out is crystalline and of a bright yellowish red color.

I claim:—

1. The method of producing ortho-nitro-ortho-amidophenol-para-sulphonic acid, which comprises dissolving about 100 parts of substantially pure ortho-amidophenol-para-sulphonic acid in about 300 parts of concentrated sulfuric acid, and subjecting the same to nitration with approximately the theoretical amount of mixed acid required for the nitration, the temperature being maintained at about 0° C., or below, during the nitration.

2. The method of producing azo-compounds, which comprises dissolving substantially pure ortho-amidophenol-para-sulphonic acid in concentrated sulfuric acid, nitrating the same by the addition of a suitable nitrating agent, neutralizing the greater part of the sulfuric acid present, subjecting the ortho-nitro-ortho-amidophenol-para-sulphonic acid, while still in admixture with the thus neutralized solution, to diazotization by the addition of alkali nitrite, and coupling the resulting diazo compound with a compound suitable for the formation of azo dye.

3. The method of preparing a solution of the diazo compound of o-nitro-o-amino-phenol-p-sulphonic acid, of sufficient purity to be used directly for the production of azo compounds, which comprises dissolving substantially pure o-aminophenol-p-sulphonic acid in concentrated sulfuric acid, nitrating the same by the addition of a suitable nitrating agent, and subjecting the o-nitro-o-aminophenol-p-sulphonic acid thus produced to diazotization without previous isolation or purification of the o-nitro-o-aminophenol-p-sulphonic acid.

4. The method of producing a solution of the diazo compound of o-nitro-o-aminophenol-sulphonic acid, of sufficient purity to be used directly for the production of azo compounds, which comprises dissolving substantially pure o-aminophenol-p-sulphonic acid in concentrated sulfuric acid, nitrating the same by the addition of a suitable nitrating agent, neutralizing the greater part of the sulfuric acid present, and subjecting (without previous isolation or purification) the o-nitro-o-aminophenol-p-sulphonic acid thus produced, while still in admixture with the thus partially neutralized solution, to diazotization by the addition of alkali nitrite.

5. The method of producing a solution of the diazo compound of o-nitro-o-amido-phenol-p-sulphonic acid of sufficient purity to be used directly for the production of azo compounds, etc., which comprises dissolving about 100 parts of sufficiently pure ortho-amidophenol-para-sulphonic acid in about 300 parts of concentrated sulphuric acid, subjecting the same to nitration with approximately the theoretical amount of mixed acids required therefor, the temperature being maintained at or about zero degrees C. or below, during the nitration, neutralizing the greater portion of the sulphuric acid present, and without previous isolation subjecting the ortho-nitro-ortho-amidophenol-para-sulphonic acid produced by the nitration, while still in admixture with the thus neutralized solution, to diazotization by the addition of sodium nitrite.

In testimony whereof I affix my signature.

HOMER W. HILLYER.